(12) United States Patent
Wheless

(10) Patent No.: US 12,126,295 B1
(45) Date of Patent: Oct. 22, 2024

(54) SYSTEMS FOR CONTROLLING A ROTATING DEVICE WITH NOTCHED ROTATING WHEEL

(71) Applicant: The United States of America as represented by the Secretary of the Navy, Keyport, WA (US)

(72) Inventor: Jonathan Wheless, Bremerton, WA (US)

(73) Assignee: The United States of America as represented by the Secretary of the Navy, Keyport, WA (US)

(*) Notice: Subject to any disclaimer, the term of this patent is extended or adjusted under 35 U.S.C. 154(b) by 0 days.

(21) Appl. No.: 18/369,811

(22) Filed: Sep. 18, 2023

Related U.S. Application Data

(62) Division of application No. 17/300,074, filed on Mar. 1, 2021, now Pat. No. 11,764,708.

(60) Provisional application No. 63/100,172, filed on Feb. 28, 2020.

(51) Int. Cl.
*H02M 1/088* (2006.01)
*H02P 3/02* (2006.01)

(52) U.S. Cl.
CPC ..................................... *H02P 3/02* (2013.01)

(58) Field of Classification Search
CPC ......................................................... H02P 3/02
See application file for complete search history.

(56) References Cited

U.S. PATENT DOCUMENTS 3,727,073 A * 4/1973 Cade ...................... F23N 5/203
431/46

* cited by examiner

*Primary Examiner* — Muhammad S Islam
(74) *Attorney, Agent, or Firm* — Stephen J. Leahu; Naval Undersea Warfare Center, Keyport

(57) ABSTRACT

An apparatus and method for rotating a part includes a sequence of relays to rotate the part given number of degrees. The apparatus does not require software or complex mechanical gearing.

5 Claims, 11 Drawing Sheets

SYSTEMS FOR CONTROLLING A ROTATING DEVICE WITH NOTCHED ROTATING WHEEL

CROSS REFERENCE TO OTHER PATENT APPLICATIONS

The present application is a divisional of and claims priority to U.S. patent application Ser. No. 17/300,074 filed Mar. 1, 2021 which claims the benefit of Provisional Patent application 63/100,172 filed Feb. 28, 2020 and titled: Electromechanical Rotation Limiting System, the complete disclosure of which is incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Machines with rotating wheels 2 or gears 4 often have a limit switch at either end of a range of motion to stop movement, as shown in FIG. 1. As wheel 2 rotates protrusion 8 also rotates until protrusion 8 contacts limit switch 10 located at a fixed position on the outer gear or wheel 4. Once protrusion 8 contacts limit switch 1o, switch 10 sends a signal to the machinery control system that then stops the rotation of wheel 2. As long as the range of motion is less than 360°, stationary limit, fixed position switches can be engaged with a simple protrusion 8 on the moving part of the machine. If the range of motion needs to be more than 360°, the mechanical limit system diagramed in FIG. 1 will not work. As soon as protrusion 8 contacts switch 10 on each revolution, the rotation of the machine will stop.

One option to enable greater than 360° of rotation is to add software to the system that counts the number of times protrusion 8 passes switch 10. When the correct number of rotations, or passes, is reached, then switch 10 is triggered and the rotation of wheel 2 stops. Software based systems require electronics and computer hardware. These computer systems must be hardened when used in harsh environments such as, for example marine applications. This requirement adds cost and decreases the reliability of the machinery. This fact in turn limits the useful applications for such machinery and the apparatus and missions that machinery is tasked to support.

Systems that employ software to count the number of revolutions of protrusion 8 before triggering switch 10, also add other types of complexity and points of failure. These failures can include programming errors or short circuits in electronics when the machine is used in wet or harsh conditions. The previous location of wheel 2 also must be remembered while the machine is powered off to ensure limit switch 10 is triggered at the right number of degrees for revolution. This feature of the software based solution also introduces additional reliability challenges and application limits.

Other proposed solutions include use of a gearbox to reduce range of motion below 360° so that two limit switches can be used without software. In some situations, however, additional mechanical hardware can't be used, for example, where space is limited. Added gear boxes also increase mechanical complexity and reduce reliability especially when gears and gear boxes are exposed to harsh conditions.

SUMMARY OF THE INVENTION

The present invention includes recognition of the problems and disadvantages of prior art devices.

The invention provides for rotation limiting across a range of valves including beyond 360 degrees without the need for software and associated electronics or cumbersome gearboxes. The limit system of the invention adds a latching relay and additional switches—direction switches—to the rotating wheel or gear.

According to one aspect of the invention limit switches are coupled to a latching relay. The relays can be configured to operate so that only the limit switch ahead of the wheel position is routed to the machine controller. When the direction switches are triggered by the protrusion on the wheel or gear, they switch the latching relay output to match the direction of movement. When the machine is powered off, the latching relay remembers the state of the rotating wheel or gear.

According to another aspect of the invention the current invention avoids additional mechanical gear hardware and avoids the complexity of software to interpret switch signals and remember the wheel or gear's location. The signals coming from the limit switch system are coupled to high reliability safety relays so that movement can be stopped even when the machine controller crashes or fails.

According to yet another aspect of the invention, the invention may also be set up such that the relays are housed away from the machine itself. The machine can thus operate in more hostile environments, such as in sea water for example, or in environments where space is limited, such as the repositioning joints for antennae; while the switch relays reside in a more protected environment.

Further advantages and features of the present invention will be described in detail below.

BRIEF DESCRIPTION OF THE DRAWINGS

Like reference numerals refer to similar elements or features throughout the drawings.

DESCRIPTION OF EXEMPLARY EMBODIMENTS OF THE INVENTION

Figure 1:
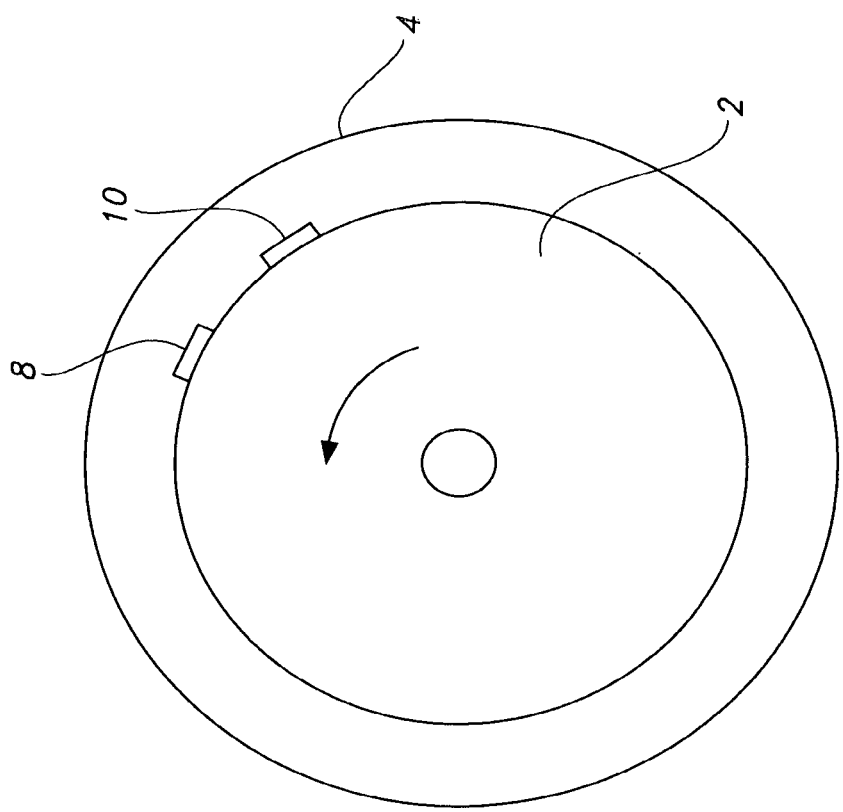
FIG. 1 is an illustration of a prior art mechanical rotation limiter according to an embodiment of the invention.
Figure 2A:
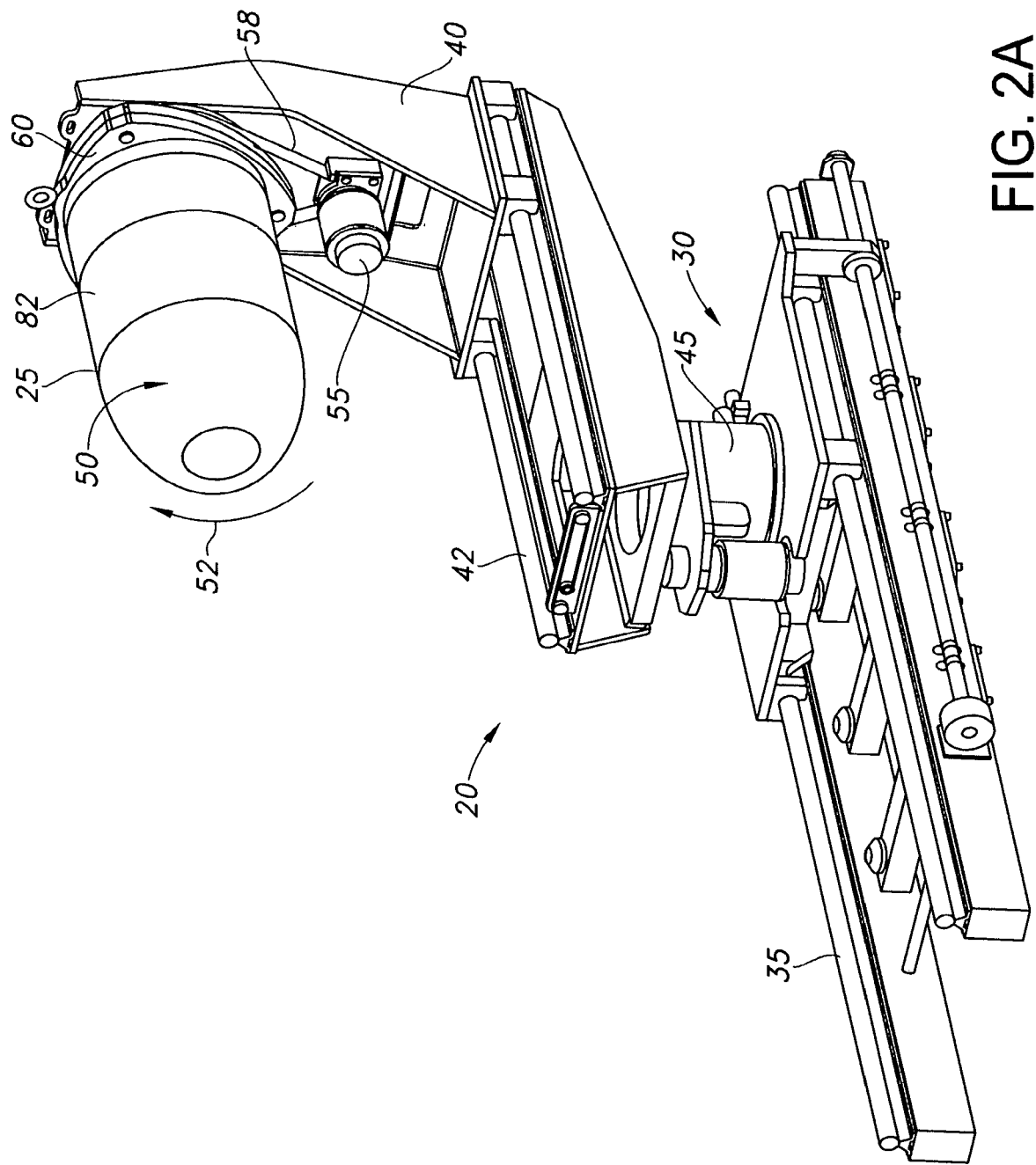
FIG. 2A is a front view of an example machine having a rotating part.
Figure 2B:
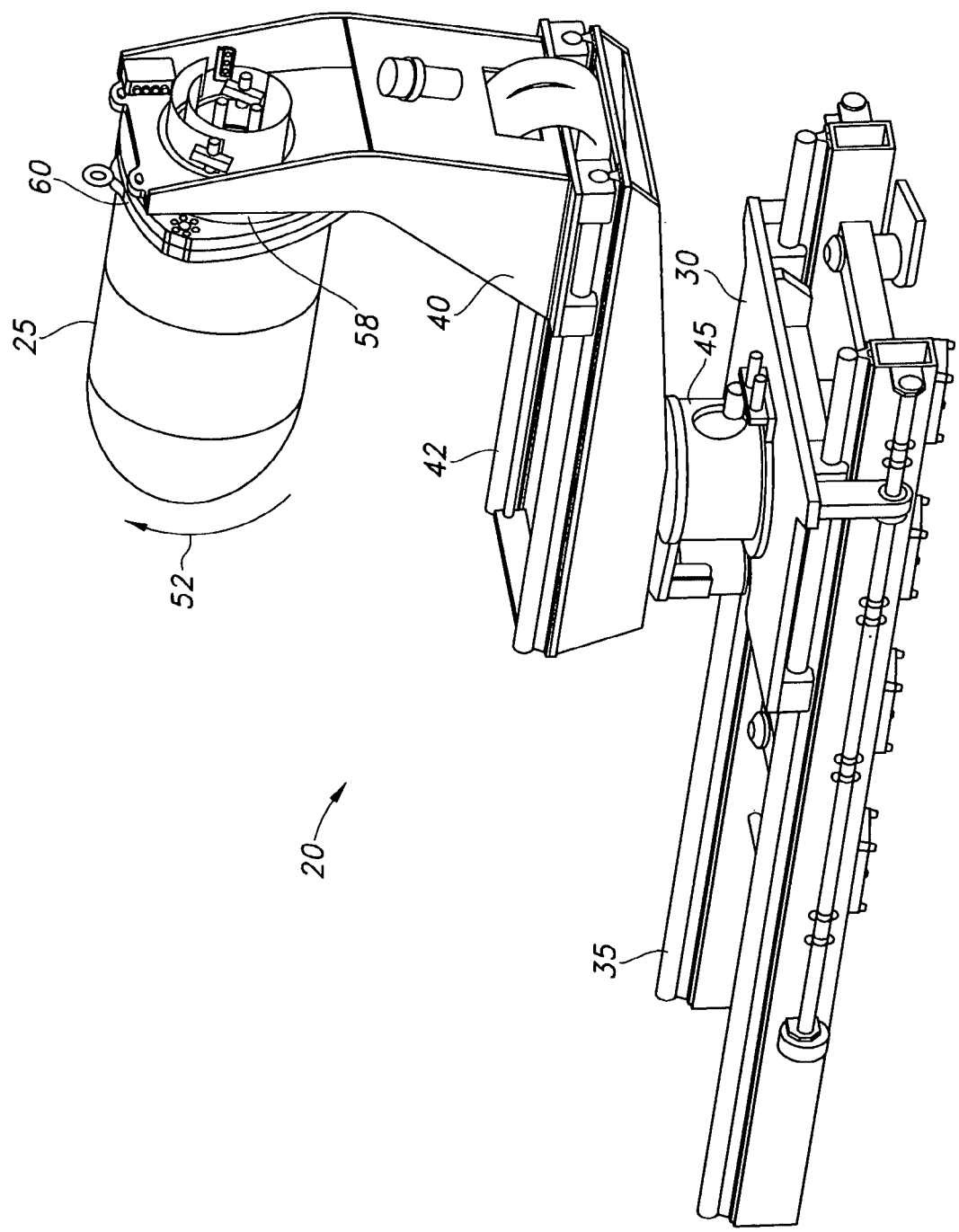
FIG. 2B is a rear view of an example machine having a rotating part.

FIGS. 2A-2B show an example machine 20, useful for describing the design, operation and features of the invention. Machine 20 positions a part 25 in one or more directions. Machine 20 can move part 25 longitudinally by sliding subcomponent 30 along a plurality of rails 35. Part 25 can then be more precisely positioned longitudinally by sliding apparatus 40 along rails 42. Apparatus 40 can also be swiveled by rotating apparatus 40 about spindle 45. Part 25 can also be turned or rotated in the direction of arrows 50 or 52 a precise number degrees of revolution using the mechanism and methods of the present invention.

As drawn in FIG. 2A, rotation of part 25 is driven by a motor 55 that drives a belt 58 that turns a rotating wheel or device 6o coupled to part 25. The number of degrees part 25 rotates is implemented according to the teachings of the invention as described now in detail.

Figure 3A:
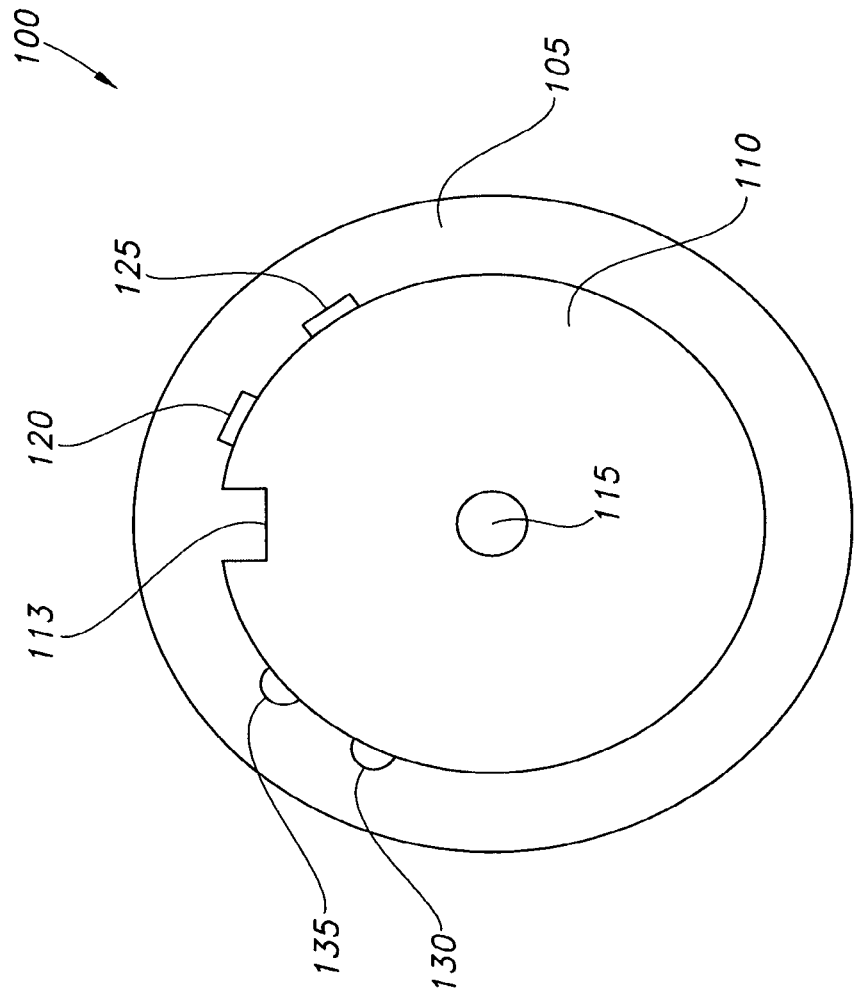
FIG. 3A is an illustration of an electromechanical rotation limiter according to an embodiment of the invention.

FIG. 3A is an illustration of an electromechanical rotation limiter 100, according to the embodiment of the invention. The limiter of FIG. 3A comprises a limiter and sensor housing 105, notched wheel 110, notch 113, wheel bolt 115, positive limiter 120, negative limiter 125, positive directional sensor 130, and negative directional sensor 135.

Figure 3B:
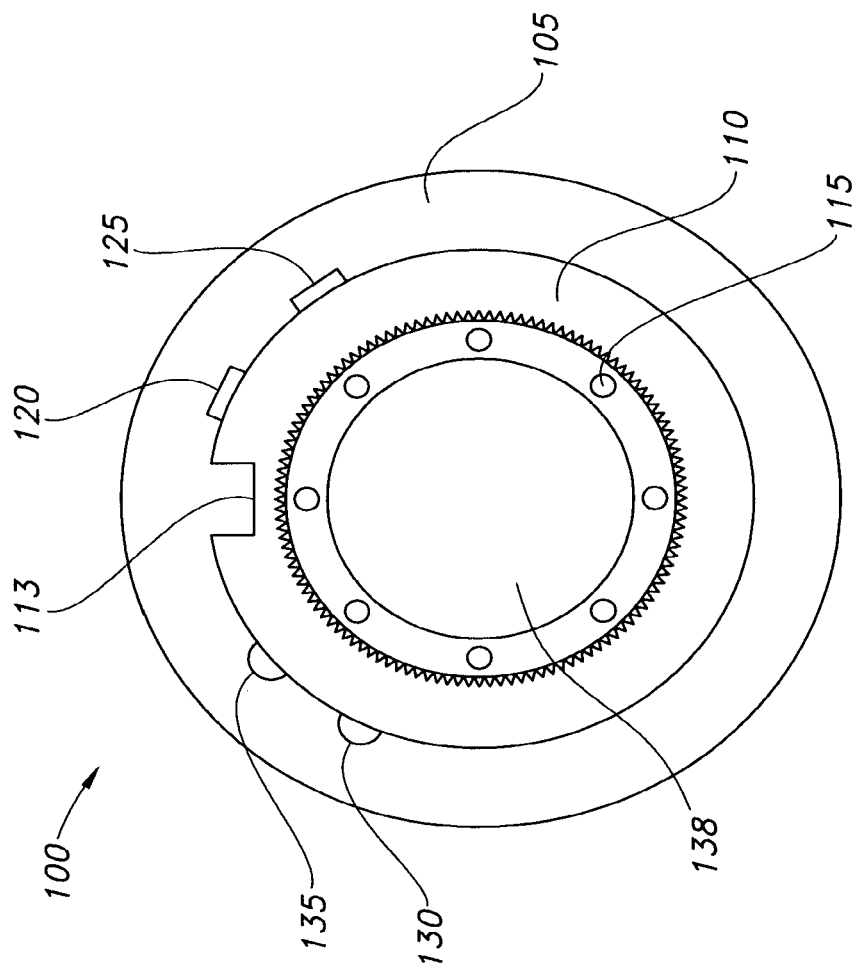
FIG. 3B illustrates another embodiment of an electromechanical rotation limiter according to an embodiment of the invention.

FIG. 3B illustrates an alternative embodiment of electromechanical rotation limiter 100, wherein a plurality of wheel bolts 115 are used to secure electromechanical rotation limiter 100 to a gear or another wheel. The embodiment of FIG. 3B is useful for setting rotation limits on apparatuses where the center opening 138 must be kept open for hoses or wiring or other such equipment. The embodiments of FIGS. 3A and 3B work in a similar manner as described below.

Figure 4:
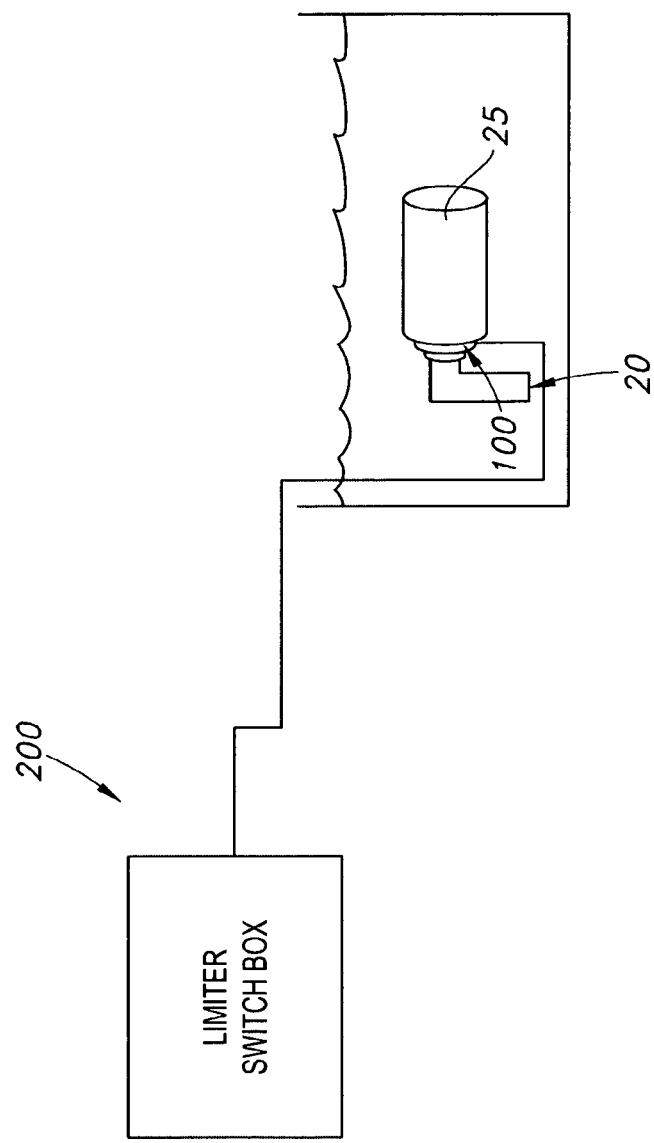
FIG. 4 is a diagram of a part rotation system according to an embodiment of the invention.
Figure 5:
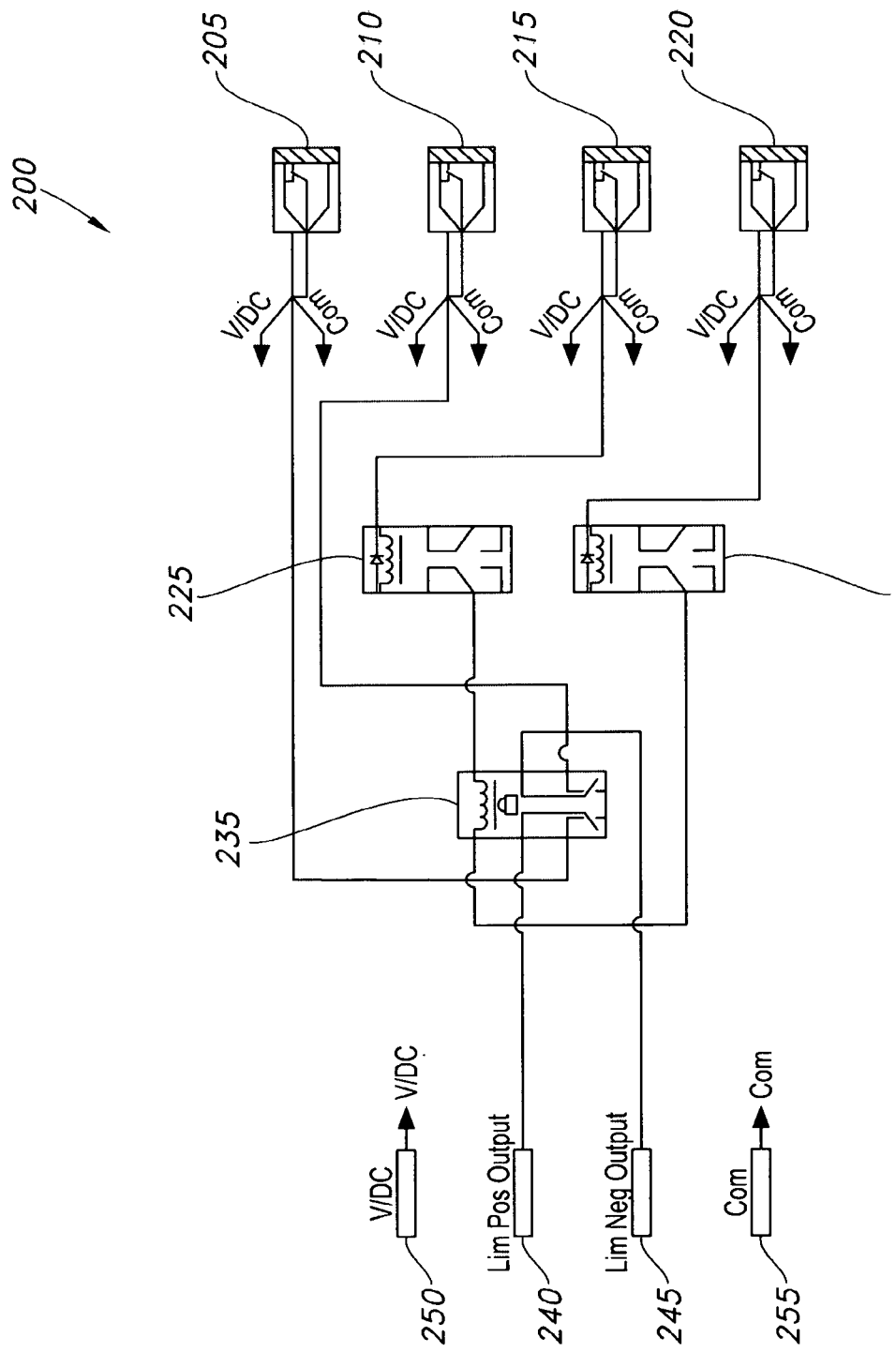
FIG. 5 is a relay circuit according to an embodiment of the invention.
Figure 6:
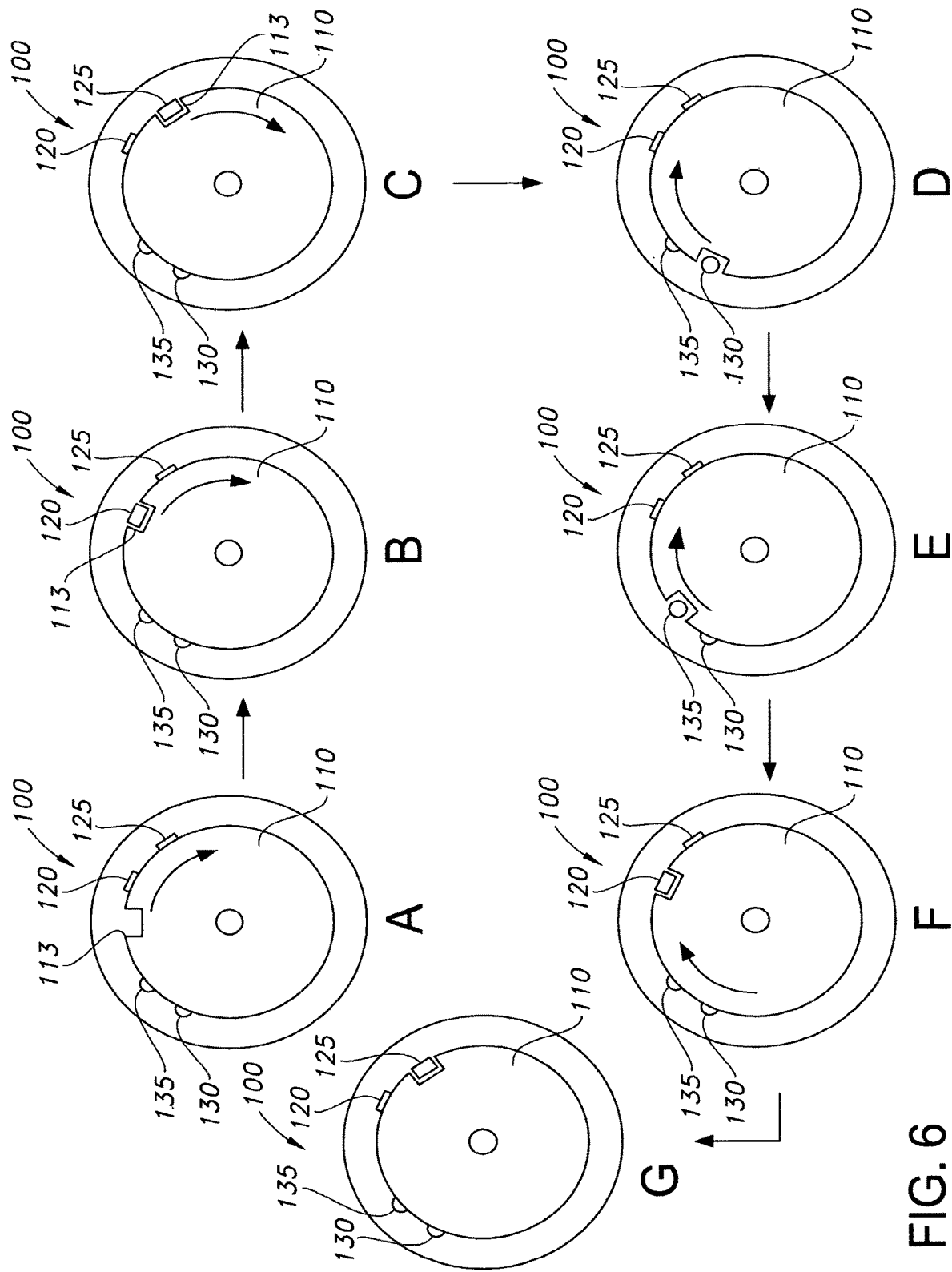
FIG. 6 shows an electromechanical rotation limiter in operation according to an embodiment of the invention.
Figure 7:
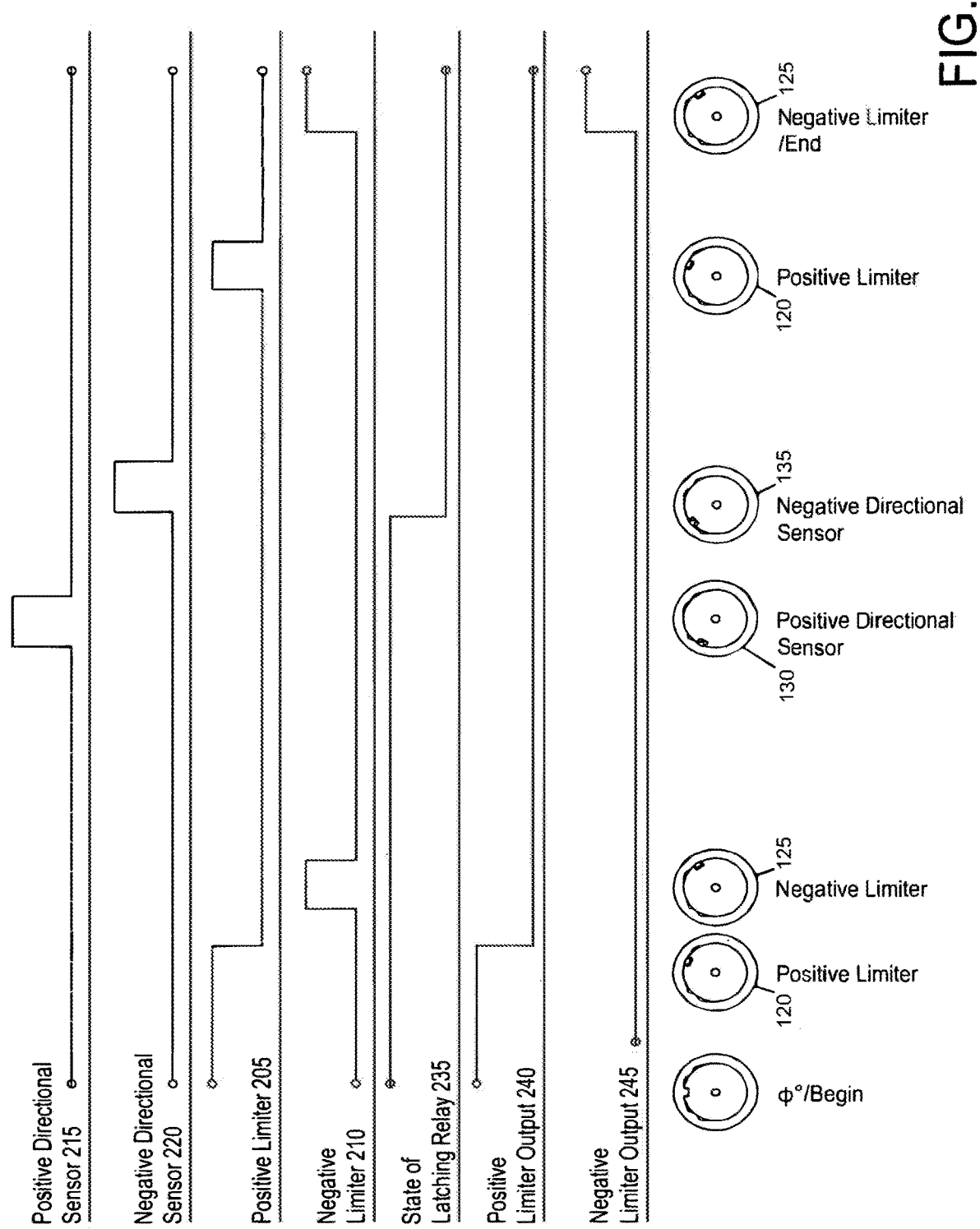
FIG. 7 illustrates control signal states of a relay circuit in operation according to an embodiment of the invention.

The design and operation of the invention are best explained via an illustrative example using FIGS. 2-7. In the illustrative example, wheel 110 rotates to turn part 25 of FIGS. 2A-2B through 420 degrees of rotation. FIG. 4 is an example of a system employing an electro mechanism rotation limiter relay circuit, and part rotation machinery according to one embodiment of the invention. FIG. 5 is an example of a relay circuit for controlling the rotation of wheel 110 and hence part 25. FIG. 6 illustrates the movement of wheel 110 and the engagement of limit switches and sensors step by step as wheel 110 rotates. FIG. 7 shows the state of the relays and signals of the example circuit of FIG. 4 as wheel 110 passes through each of the steps in FIG. 6.

Electromechanical rotation limiter 100 is controlled by a rotation circuit 200 as illustrated in FIG. 4. In the illustrative example to be discussed herein, the system of FIG. 4 rotates part 25 of FIGS. 2A-2B 420 degrees. According to one possible embodiment, as shown also in FIG. 4, rotation circuit 200 may housed away from electromechanical rotation limiter 100, outside of the operation environment. Housing rotation circuit 200 away from the operations environment allows for fewer points of failure because it is kept away from corrosive elements, such as for example, salt water, hazardous gasses or chemicals or other severe conditions which might be present at the location of part 25.

As drawn in FIG. 5 rotation circuit 200 includes a positive limiter 205, a negative limiter 210, a positive directional sensor 215, a negative directional sensor 220, a positive standard relay 225, a negative standard relay 230, a latching relay 235, a positive limiter output 240, a negative limiter output 245, a DC power connection 250, and a communication connection 255. DC power connection 250 provides the power to rotation circuit 200 for operation. Communication connection 255 couples rotation circuit 200 to electromechanical rotation limiter 100 via a wire sized and isolated in a manner appropriate to the operation environment.

According to one possible embodiment of the invention, relays 225, 230 comprise Omron G2R-2 SNDI DC24 (S). Relay 235 comprises a TE connectivity RT 424A24. Similar types of relays as known to those of skill in the art may also be used. Limiters 205 and 210 and negative and positive directional sensors 215 and 220 comprise a Panasonic GX-H8A-P-R inductive switch. Other inductive switches and sensors known to those of skill in the art can also be used. In one embodiment of the invention, communication connection 225 comprises a return current terminal, for example a terminal of opposite polarity to terminal 250. Other communications switches known to those of skill in the art can also be used.

FIG. 6 illustrates the example of electromechanical rotation limiter 100 in operation. In step A electromechanical rotation limiter 100 starts with notched wheel 110 at 0 degrees and starts rotating in a clockwise direction, also designated a negative direction for the purpose of the this illustration. In step B notch 113 passes over positive limiter 120, engaging positive limiter 120. In this example, positive limiter 120 is located at 45 degrees. As this is the first rotational pass and because positive limiter 120 is engaged before negative limiter 125, positive limiter 120 does not result in relay circuit 200 halting motion of wheel 110 as wheel 110 continues to rotate in step C. Notch 113 then passes over negative limiter 125, engaging negative limiter 125. In this example, limiter 125 is located at 60 degrees. As this is the first rotational pass, negative limiter 125 does not activate the relay circuit 200 to halt wheel 110 rotation.

In step D, notched wheel 110 continues to move in a clockwise direction. Notch 113 passes over positive direction sensor 130, engaging positive directional sensor 130. Since positive directional sensor 130 is engaged before negative directional sensor 135, positive directional sensor 130 does not result in relay circuit 200 halting motion of wheel 110.

In step E, Notch 113 passes over negative directional sensor 135, engaging negative sensor 135. Negative directional sensor 135 is engaged after positive directional sensor 130, causing the relay circuit 200 to send a signal to negative limiter 125 that will stop notched wheel 110 from continuing to turn when wheel 110 eventually passes over negative limiter 125. Notched wheel 110 continues to turn in a clockwise direction in step F, passing over positive limiter 120 for a second time. In this example this action produces no effect on wheel motion and relay circuit 200 operates to permit continued rotation of wheel 110.

In step G, Notch 113 passes over negative limiter 125 for a second time. Negative limiter 125 has received a signal via relay circuit 200 after wheel 110 passed negative directional sensor 135 and limiter 125 is now activated to stop notched wheel no from turning. All of the signals passed between the limiters and the directional sensors go to and come from relay circuit 200.

The operation of relay circuit 200 to effect the wheel operation described above is now discussed. The state of the various relays of circuit 200 are shown in FIG. 7 as the wheel passes through the positions diagramed in FIG. 6. The output of rotation circuit 200 begins in the last state notched wheel 110 traveled in. In this example, and purely for discussion of this illustrative example, assume notched wheel 110 last traveled in a counterclockwise direction, or a positive direction, and rotation circuit 200 begins the example in an initial state with a positive output and positive limiter output 240 in an on state. As such, the state of latching relay 235 also begins in a positive state.

As notched wheel 110 turns, passing over positive limiter 120, a signal travels to rotation circuit 200 to positive limiter 205. Positive limiter 205 sends the signal to latching relay 235. Positive limiter 205 is activated for the first time and before negative limiter 210. Latching relay 235 returns a signal to positive limiter 205 to deactivate. Positive limiter 205 deactivating causes the output of rotation circuit 200 to become null, or neutral.

As notched wheel 110 passes over negative limiter 125, a signal travels to negative limiter 210. Negative limiter 210 sends the signal to latching relay 235. Negative limiter is activated for the first time and after positive limiter 205. Latching relay 235 returns a signal to negative limiter 210 to deactivate.

Notched wheel 110 continues to turn, passing over positive directional sensor 130. A signal travels from positive directional sensor 130 to rotation circuit 200 to positive directional sensor 215. Positive directional sensor 215 sends the signal to positive standard relay 225, which sends the signal to latching relay 235. Positive directional sensor 215 is activated before negative directional sensor 220. Latching relay 235 returns a signal to positive directional sensor 215, via positive standard relay 225, to deactivate.

Notched wheel 110 passes over negative directional sensor 135. A signal travels from negative directional sensor 135 to negative direction sensor 220. Negative directional sensor 220 sends the signal to negative standard relay 230, which sends the signal to latching relay 235. Negative directional sensor 220 is activated after positive directional sensor 215. Latching relay 235 returns a signal to negative directional sensor 220, via negative standard relay 230, to activate and engage negative limiter 125. Activating negative directional sensor 220 changes the state of latching relay 235 to negative.

As notched wheel 10 continues to turn, passing over positive limiter 120, a signal travels to rotation circuit 200 to positive limiter 205. Positive limiter 205 sends the signal to latching relay 235. Positive limiter 205 is activated for the second time but has not received a signal to engage. Latching relay 235 returns a signal to positive limiter 205 to deactivate.

Notched wheel 110 passes over negative limiter 125. Negative limiter 125 receives a signal from negative limiter 220 to engage. Notched wheel 110 stops turning at negative limiter 125. Negative limiter 125 being engaged changes the output of rotation circuit 200 to negative switching negative limiter output 245 to an on state.

Notched wheel 110 has turned greater than 360°. Specifically in this example, wheel 110 turns 420 degrees. Other rotation limits and directions are possible according to the teachings of the invention.

In another illustrative example, it is possible for electromechanical rotation limiter 100 to rotate up to 720°. The a degrees of rotation is determined by the location of the limiter being engaged and the starting position of notched wheel 110. There are many layout possibilities. FIG. 7 shows how a layout of a plurality of limiters 120 and 125, and sensors 130 and 135 may be situated.

Figure 8:
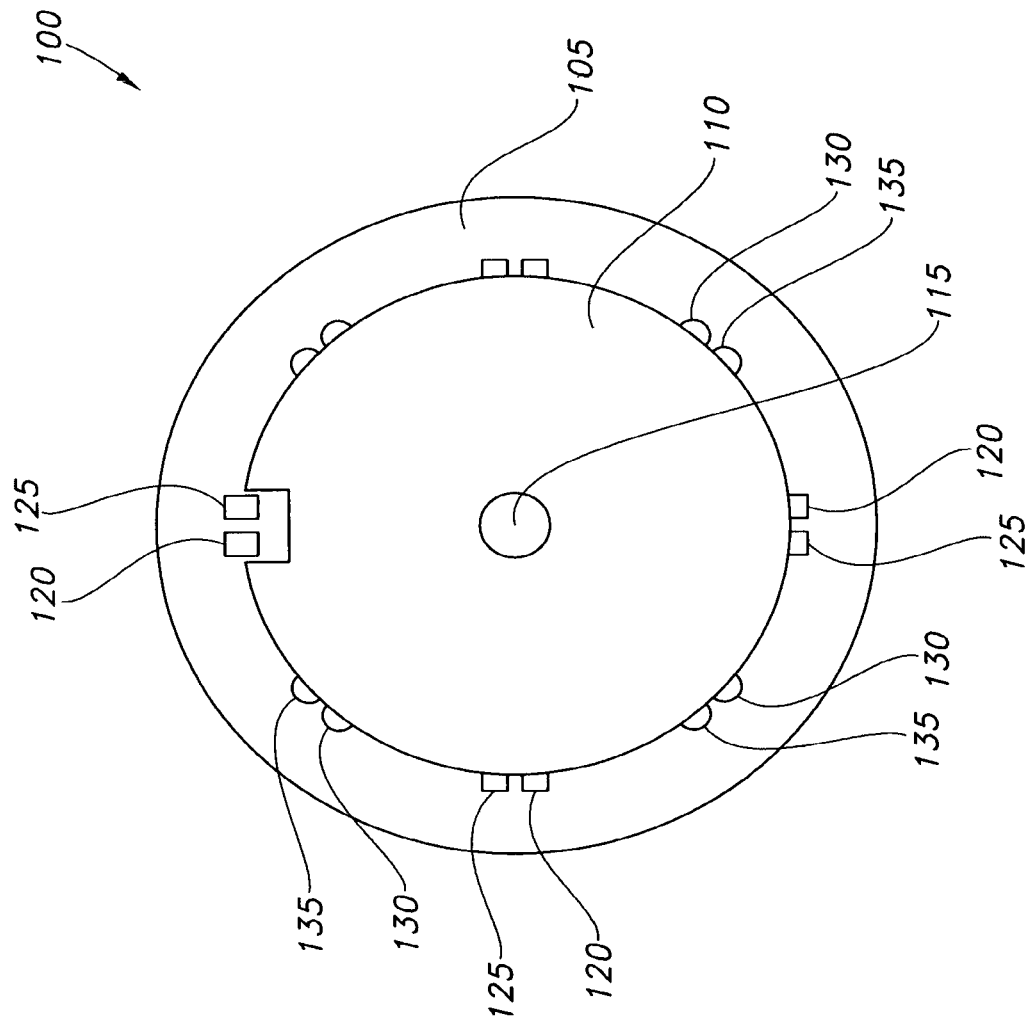
FIG. 8 shows a layout of a plurality of limiters and sensors situated according to an alternative embodiment of the invention.
Figure 9:
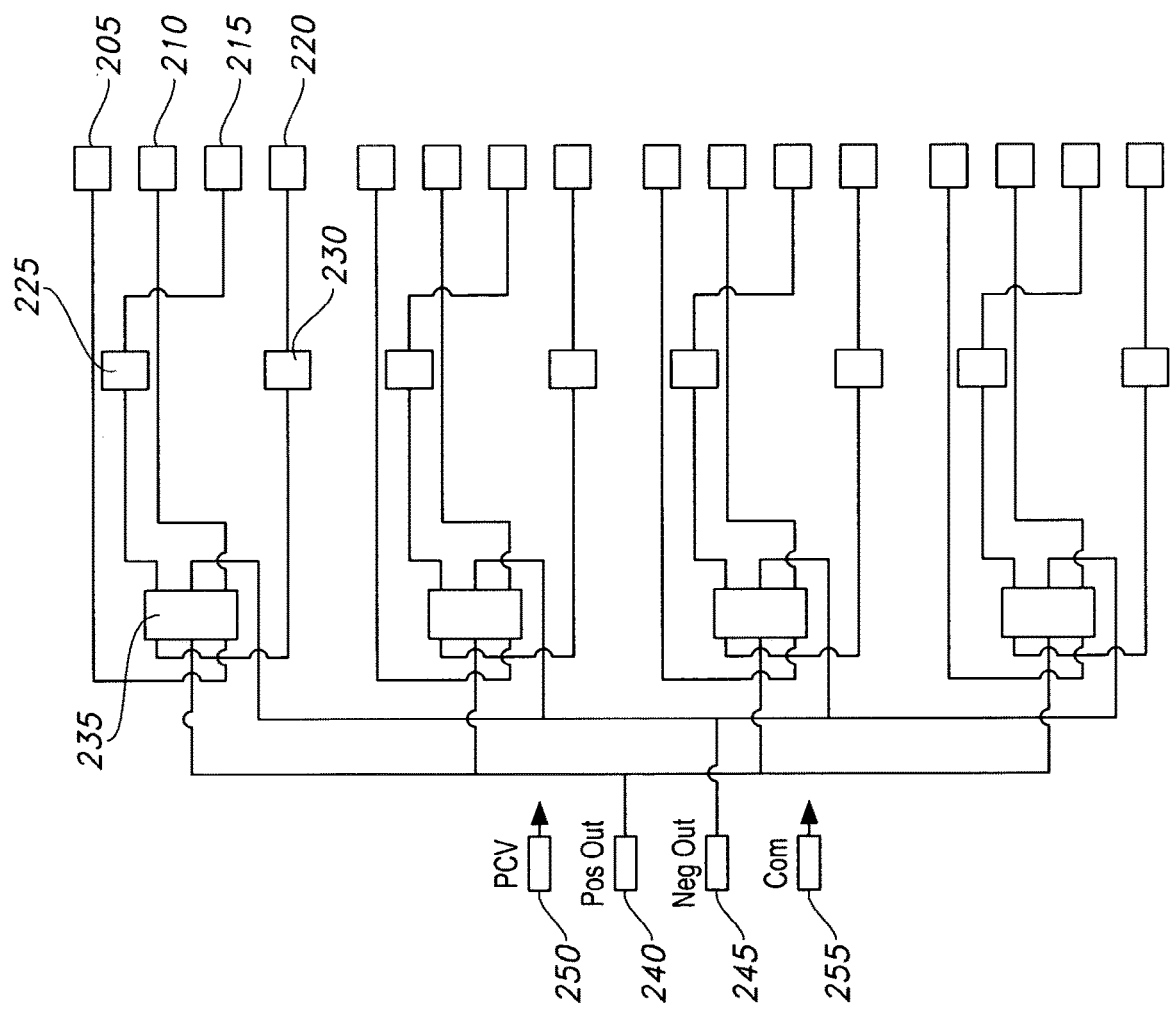
FIG. 9 shows an alternate relay circuit for a plurality of limiters and sensors according to an embodiment of the invention.

In these other layouts, additional rotation circuits 200 would be added to a circuit board, as shown in FIG. 8. These additional rotation circuits 200 would be connected to a set of positive limiter output 240, negative limiter output 245, DC connection 250, and communication connection 255. These additional layouts would operate in a similar manner as described above.

The subject matter defined in the appended claims is not necessarily limited to the specific features or acts described above. Rather, the specific features and acts are disclosed as example forms of implementing the claims. Many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for controlling rotation through a predefined degree of arc, comprising:
    a rotating wheel having a notch;
    a rotation limiter located on a structure separate from the rotating wheel, comprising:
        a sensor for sensing when the notch is proximate the rotation limiter and outputting a first signal, and
        a switch for setting the rotation limiter in one of a first state or a second state; and,
    a relay circuit coupled to the rotation limiter for receiving the first signal and for outputting a second signal to select between the first state and the second state.

2. The system of claim 1, further comprising a drive system coupled to the rotating wheel and to the rotation limiter wherein the drive system rotates the rotating wheel in response to a control signal received from the rotation limiter.

3. The system of claim 1, wherein the predefined degree of arc is greater than 360 degrees.

4. The system of claim 1, further comprising a part coupled to the rotating wheel.

5. A system for controlling rotation of a mechanical device through a predefined degree of arc, comprising:
    a rotating wheel having a notch;
    a positive direction rotation sensor having a positive sensor output for outputting a positive direction signal when the notch passes over the positive direction sensor;
    a negative direction rotation sensor having a negative sensor output for outputting a negative direction signal when the notch passes over the negative direction sensor;
    a positive relay having a positive relay input coupled to receive the positive direction signal and having a positive relay output;
    a negative relay having a negative relay input coupled to receive the negative direction signal and having a negative relay output;
    a positive limiter having an output for outputting a positive limiter state signal wherein the positive limiter has one of an active and inactive positive limiter states;
    a negative limiter having an output for outputting a negative limiter state signal wherein the negative limiter has one of an active and inactive negative limiter states;
    a latching relay, comprising:
        a first input coupled to the positive relay output;
        a second input coupled to the negative relay output;
        a third input coupled to receive the positive limiter state signal;
        a fourth input coupled to receive the negative limiter state signal; and an output coupled to the positive limiter and to the negative limiter for outputting a command signal to at least one of the positive limiter and the negative limiter to change state, wherein the mechanical device rotates when both the positive limiter and the negative limiter are in an inactive state; and, a drive system coupled to the rotating wheel, to the positive rotation limiter and to the negative rotation limiter, and wherein the drive system rotates the rotating wheel according to a state of the positive rotation limiter and the negative rotation limiter.

* * * * *